(12) United States Patent
Devendran et al.

(10) Patent No.: US 12,375,382 B2
(45) Date of Patent: Jul. 29, 2025

(54) DISTRIBUTED PATH COMPUTATION AND CENTRALIZED PATH ENFORCEMENT IN COMPUTER NETWORKS

(71) Applicant: Cisco Technology, Inc., San Jose, CA (US)

(72) Inventors: Vijay Kumar Devendran, Fremont, CA (US); Rajagopalan Janakiraman, Cupertino, CA (US); Sathiskumar Segamalai Murugesan, Tracy, CA (US); Kirankumar Meda, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 166 days.

(21) Appl. No.: 18/454,704

(22) Filed: Aug. 23, 2023

(65) Prior Publication Data

US 2025/0071044 A1    Feb. 27, 2025

(51) Int. Cl.
| | |
|---|---|
| *H04L 29/08* | (2006.01) |
| *H04L 43/0852* | (2022.01) |
| *H04L 43/0876* | (2022.01) |
| *H04L 43/20* | (2022.01) |
| *H04L 45/12* | (2022.01) |
| *G06F 15/16* | (2006.01) |

(52) U.S. Cl.
CPC .......... *H04L 43/20* (2022.05); *H04L 43/0852* (2013.01); *H04L 43/0876* (2013.01); *H04L 45/124* (2013.01)

(58) Field of Classification Search
CPC . H04L 43/20; H04L 43/0852; H04L 43/0876; H04L 45/124; H04L 29/08; G06F 15/16
USPC .......................................................... 709/224
See application file for complete search history.

(56) References Cited

U.S. PATENT DOCUMENTS

| | | | | |
|---|---|---|---|---|
| 7,089,313 | B2* | 8/2006 | Lee ........................... | H04L 9/40 709/227 |
| 8,516,071 | B2* | 8/2013 | Jackson .............. | H04L 67/1061 709/217 |
| 2005/0253397 | A1* | 11/2005 | Kumar .................... | B61C 15/10 291/2 |
| 2014/0148192 | A1* | 5/2014 | Hodges ................. | H04W 4/023 455/456.1 |
| 2018/0331946 | A1 | 11/2018 | Olofsson et al. | |
| 2019/0199637 | A1 | 6/2019 | Paramasivam | |

(Continued)

*Primary Examiner* — Jude Jean Gilles
(74) *Attorney, Agent, or Firm* — Lee & Hayes, P.C.

(57) ABSTRACT

This disclosure describes techniques for enabling distributed path computation and centralized path enforcement in a computer network used to implement a software application. In some cases, the disclosed techniques include using a central controller that initializes and coordinates monitoring agents deployed to network regions. The monitoring agents may collect monitoring data associated with application segments in their respective regions and share this data with each other. Using the aggregated data, the agents can compute optimal paths between application segment pairs spanning multiple regions. The optimal inter-region paths may be sent to the controller, which can program the paths into the routing application programming interfaces (APIs) of the various network environments like public cloud and on-premises networks.

20 Claims, 11 Drawing Sheets

(56) References Cited

U.S. PATENT DOCUMENTS

2021/0194778 A1 6/2021 Tidemann et al.
2023/0059537 A1 2/2023 Gavand et al.

* cited by examiner

DISTRIBUTED PATH COMPUTATION AND CENTRALIZED PATH ENFORCEMENT IN COMPUTER NETWORKS

TECHNICAL FIELD

This present application pertains to network communication systems, and more particularly, to techniques for path configuration in computer networks.

BACKGROUND

Cloud providers offer basic, static network configuration and routing capabilities. However, configuring network paths between application components across multiple clouds or between cloud and on-premises resources is largely manual. This rigid approach limits the ability to select optimal network paths tailored to requirements of larger and more complex software applications.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
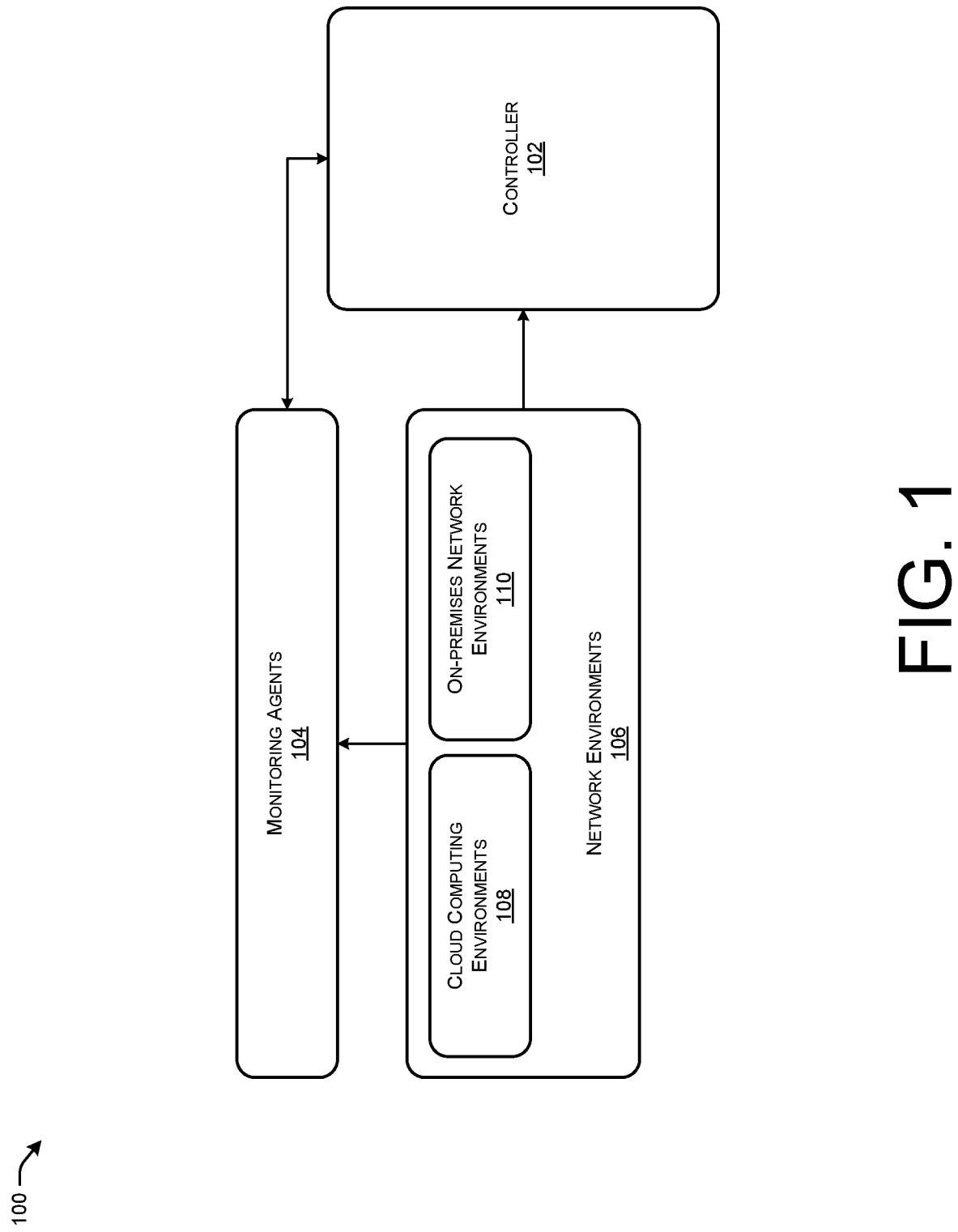
FIG. 1 depicts an environment for enabling distributed path computation and centralized path enforcement in a computer network used to implement a software application.

This disclosure describes techniques for enabling distributed path computation and centralized path enforcement in a computer network used to implement a software application. In some cases, the techniques described herein relate to a method including detecting, by a first monitoring agent configured to monitor a first network region in a first a first computer network associated with a software application, first monitoring data associated with a first application segment in the first network region and second monitoring data associated with a second application segment in the first network region, wherein: (i) the first monitoring data represents a first geographic location of a first computer functionality associated with the first application segment, and (ii) the second monitoring data represents a first bandwidth measure for a first network link in the second application segment. The method may further include receiving, by the first monitoring agent and from a second monitoring agent configured to monitor a second network region of the first computer network, third monitoring data associated with a third application segment in the second network region and fourth monitoring data associated with a fourth application segment in the second network region, wherein: (i) the third monitoring data represents a second geographic location of a second computer functionality associated with the third application segment, and (ii) the fourth monitoring data represents a second bandwidth measure for a second network link in the fourth application segment. The method may further include determining, by the first monitoring agent and based on the third monitoring data and the fourth monitoring data, a first path score for a first candidate path between the first application segment and the third application segment and a second path score for a second candidate path between the second application segment and the fourth application segment. The method may further include providing, by the first monitoring agent and to a controller, output data determined based on the first path score and the second path score, wherein the controller is configured to control traffic flow between the first network region and the second network region based on the output data.

Additionally, the techniques described herein may be performed by a system and/or device having non-transitory computer-readable media storing computer-executable instructions that, when executed by one or more processors, performs the method described above.

Example Embodiments

This disclosure describes techniques for enabling distributed path computation and centralized path enforcement in a computer network used to implement a software application. In some cases, the disclosed techniques include using a central controller that initializes and coordinates monitoring agents deployed to network regions. The monitoring agents may collect monitoring data associated with application segments in their respective regions and share this data with each other. Using the aggregated data, the agents can compute optimal paths between application segment pairs spanning multiple regions. The optimal inter-region paths may be sent to the controller, which can program the paths into the routing application programming interfaces (APIs) of the various network environments like public cloud and on-premises networks.

In some cases, the techniques described herein relate to a controller that initializes and coordinates a set of monitoring agents deployed to monitor application segments residing in various network regions. In some cases, the controller receives computed optimal path data from the agents on an ongoing basis. The controller processes these optimal paths and selects appropriate paths to program into the routing APIs of the network environments like cloud and on-premises networks. The controller may run on dedicated hardware with its own processing and memory resources, or as a software application on shared hardware. The controller may provide a user interface for administrators to configure policies and view logs and/or analytics.

In some cases, the techniques described herein relate to monitoring agents that are deployed to monitor various network regions associated with an application's computer network. A network region may be a logically isolated section of a network environment. For example, a region could be an availability zone in a public cloud or a data center in an on-premises environment. The agents may be allocated to monitor the application segments within their respective network regions. An application segment may be a software or hardware component performing a specific function in the overall application architecture implemented on the network. For example, an application segment could be a front-end web server, a backend database, a load balancer, and/or the like. In some cases, monitoring data packets are associated with timestamps.

In some cases, the monitoring agents continually collect various monitoring metrics about the application segments in their regions. The agents may query monitoring APIs like AWS CloudWatch, Azure Monitor, and on-premises solutions like SolarWinds to gather the metrics. Examples of monitoring data collected include geographic location of segments, network latency data, bandwidth utilization data, hop counts, and attachment types of network links. Attachment types may refer to the cloud networking functionality used, such as VPC peering, direct connect, and/or the like. After collecting the monitoring metrics, the monitoring agents may exchange the data with each other. This allows each agent to gain visibility into the network conditions across multiple regions, not just their own local region. In some cases, monitoring agents are arranged into topologies like full-mesh or neighborhood patterns to efficiently exchange the monitoring data.

In some cases, the techniques described herein relate to distributed computation of optimal paths by monitoring agents. In some cases, using the aggregated monitoring data, the monitoring agents compute optimal network paths between application segment pairs spanning across regions. For each pair, a monitoring agent may first identify candidate path options that meet connectivity and distance requirements. The candidates are then ranked multiple times based on criteria like geographic distance traversed, link latency, link bandwidth, presence of routing nodes, and attachment type desirability. The multi-dimensional rankings produce a set of scores for each candidate path. Afterward, a path score is calculated for each path score based on the mean or weighted mean of the path's ranking scores. In some cases, if a candidate path ranks highest across all criteria, it is chosen as optimal. Otherwise, the path with the highest overall score is selected as optimal.

In some cases, the techniques described herein relate to using path computation outputs generated by monitoring agents to set routing policies of an application's network. In some cases, after computing the optimal inter-region paths, the monitoring agents send the optimal path data to the central controller. In some cases, the controller processes the optimal paths and selects appropriate ones to program into the various network environments. In some cases, the central controller then interacts with the native routing APIs of the cloud and on-premises networks. The controller translates the selected optimal paths into routing instructions to provide the routing APIs. These payloads may contain configuration details like source, destination, metrics, and Quality of Service (QOS) requirements. In some cases, the routing APIs receive the payloads and update their routing tables and configurations to reflect the statically selected optimal paths. In some cases, the centralized enforcement of the optimized paths computed in a distributed manner ensures consistent and optimal connectivity across hybrid multi-region environments.

In some cases, the techniques described herein relate to the control plane method for finding and maintaining optimal network paths between workload application segments deployed across multiple public clouds and on-premises data centers. The control plane may include monitoring agents running on cloud native routers or overlay network virtual appliances (NVAs) across different cloud regions and on-premises networks. The monitoring agents exchange packets to obtain data about characteristics of the cloud network paths like latency, bandwidth, geographic location, number of hops, and/or the like. Using this path data, the monitoring agents may calculate path scores and select optimal paths. The monitoring agents may continuously monitor the paths and recalculate path scores to maintain optimal paths. If a better path becomes available, the controller may switch optimal paths based on agent outputs.

In some cases, the techniques described herein relate to optimizing network traffic flow between different regions in a distributed computer network. In some cases, multiple monitoring agents are deployed in the various network regions to detect performance data like geographic location of network functionalities, bandwidth measurements, etc. The agents exchange the monitored data with each other. Using the collected data, the agents can calculate path scores between application segments in different regions based on factors like geographical distance, available bandwidth, latency measurements, etc. The path scores provide a quantified assessment of the quality of each candidate path. The monitoring agents provide these path scores to a centralized controller.

In some cases, using the path scores, the controller can determine optimal paths and control traffic routing between the regions accordingly. The agents may continuously detect updated monitoring data, recalculate path scores, and provide updated recommendations to the controller. This allows the system to dynamically adapt to changes in network conditions.

In some cases, the techniques described herein enable improved management of network connectivity across multi-cloud environments and with respect to critical software applications. For example, in some cases, the techniques described herein enable a cloud-agnostic control plane that can dynamically find and select optimal paths between application segments deployed across multiple public clouds and/or on-premises data centers. This causes overcoming the limitations of static, manual path selection and maintenance offered by many public cloud providers today. Additionally, continuous monitoring and changing adopted network paths to maintain optimal path scores provide the ability to respond dynamically to changes in cloud network conditions. This ensures critical applications get the network performance they need even as conditions fluctuate.

FIG. 1 depicts an environment 100 for enabling distributed path computation and centralized path enforcement in a computer network used to implement a software application. The computer network includes a controller 102, a set of monitoring agents 104, and a set of network environments 106 such as a set of cloud computing environments 108 and a set of on-premises network environments 110.

Controller 102 may be a hardware device or software application that may be configured to manage networking functionalities performed by various components of environment 100. In some cases, the controller 102 initializes and coordinates the monitoring agents 104 and receives computed optimal path data from the monitoring agents 104. In some cases, the controller 102 processes these optimal path data to select appropriate paths to program into the routing APIs of the various network environments 106. Controller 102 may be implemented on a standalone hardware device with dedicated processing and memory resources. In some cases, the controller 102 may be a software application running on shared hardware. Controller 102 may interface with administrators through a user interface that allows configuring policies and viewing logs/analytics. Controller 102 may also integrate with external management platforms.

In some cases, the controller 102 programs routing APIs of the network environments 106 to establish the optimal paths as statically selected paths. In some cases, controller 102 interacts with routing APIs by sending specific API calls associated with the API schema of each network environment within the group. These API calls may include configuration details, such as source, destination, preferred routing metrics, and any QoS (Quality of Service) requirements. In some cases, after controller 102 determines an optimal path, the controller 102 translates this path into a set of routing instructions. These instructions are encoded in a format compatible with the routing APIs, such as in the form of JavaScript Object Notation (JSON) or Extensible Markup Language (XML) payloads. Upon receiving these payloads, the routing APIs update their routing tables or configurations to reflect the statically selected paths.

In some cases, each network environment 106 (e.g., each public cloud environment or each private on-premises environment) includes multiple network regions. A network region may be a logically isolated section of the network environment, such as an Amazon Web Service (AWS) region, AWS availability zone, Azure region, or an on-premises data center.

Each network region may include a set of application segments that comprise segments of the infrastructure associated with the software application. An application segment may be a software or hardware component that performs a specific function within the overall software application architecture. For example, an application segment could be a front-end web server, a backend database, a message queue, a load balancer, etc. An application segment may include VMs, containers, bare metal servers, network links between components, or other computing resources.

In some cases, an application segment includes a computer functionality, such as hardware or software functionality, implemented as part of the software or hardware infrastructure for implementing the software application. An application segment may include a software component, a hardware component, or a physical or abstract network link between two or more components. An application segment may be associated with an IP address. An application segment may include a Classless Inter-Domain Routing (CIDR) unit, a subnet within a CIDR (or) unit, a VM tag, a container label, a service label, a private link, and/or the like. In some cases, an application segment includes cloud resources like VMs (VMs), containers, load balancers, API gateways, databases, and/or the like that work together to perform functionality associated with the software application.

In some cases, a network region is associated with an identifier that includes an identifier of the network environment (e.g., cloud environment) that includes the segment and an identifier of the region. For example, in public cloud environments like AWS and Azure, the network regions have specific identifiers that can be referenced by monitoring agents 104. For example, AWS regions may be identified by named identifiers like us-east-1, eu-west-3, ap-southeast-2, and/or the like. In some cases, application segments may be identified by identifiers such as IP addresses.

For example, cloud-based application segments may be associated with VPC identifiers, subnet identifiers, VM identifiers, security group identifiers, peering connection identifiers, VPN connection identifiers, direct connect identifiers, and/or other native cloud identifiers. Similarly, Azure uses region names like East US, West Europe, Japan East, etc.

Each network region may be associated with a respective monitoring agent 104. A monitoring agent may be configured to collect monitoring data associated with application segments in the network region that is allocated to the monitoring agent and report these monitoring data to other monitoring agents 104. A monitoring agent 104 may be implemented as a software module running on a VM or a dedicated hardware device. A monitoring agent 104 may connect to network devices using protocols configured to obtain monitoring data.

For example, a monitoring agent 104 may connect to cloud provider APIs to obtain data related to the location, bandwidth, and/or latency of computing resources within application segments. A monitoring agent 104 may execute a path computation algorithm to find optimal paths using the monitoring data. Monitoring agents 104 may obtain monitoring data by querying monitoring APIs associated with network environments.

Examples of monitoring data that may be collected by a monitoring agent include data about the geographic locations of an application segment, data about the latency of network links in an application segment, data about the bandwidth of network links in the application segment, data about the number of hops associated with network links in the application segments, data about attachment types of network links in application segments, and/or the like. In some cases, the monitoring data may describe whether a computer functionality associated with an application segment is associated with a router node, such as with a cloud-native routing node or a network functions virtualization (NFV) routing node.

In some cases, an attachment type of a network link refers to the cloud attachment functionality used by the network links. Examples of cloud attachment functionalities include virtual private cloud (VPC) peering, VPC attachment to transit gateway, virtual network (VWA) attachment to a virtual wide area network (VWA), transit gateway (TGW) peering, direct connect links, Internet Protocol Security (IPSec) connections, TGW connection to Generic Routing Encapsulation (GRE) tunnels, and/or the like.

Monitoring agents 104 may continually collect monitoring data (e.g., latency data, bandwidth data, geographic location data, hop count data, attachment type data, routing node presence data, and/or the like) about application segments in their respective network regions. Monitoring agents 104 may periodically share monitoring data with each other. In some cases, each monitoring agent 104 uses the monitoring data obtained from other monitoring agents 104 to determine path scores for paths between application segments within the agent's region and application segments outside of the agent's region.

In some cases, monitoring agent 104 provides data describing, for each pair of application segments including a first segment within the agent's region and a second segment outside of the agent's region, the optimal path between the pair. In some cases, a monitoring agent 104 provides data describing, for each pair of application segments including a first segment within the agent's region and a second segment outside of the agent's region, the path score for the optimal path between the pair.

For example, consider a network that includes network region A with the application segments A1 and A2, a network region B with the application segments B1 and B2, and a network region C with application segments C1 and C2. In this example, monitoring agent A, associated with network region A, may provide monitoring data about A1 and A2 to monitoring agents B and C, associated with network regions B and C respectively. Similarly, monitoring agent B may provide monitoring data about B1 and B2 to monitoring agents A and C, and monitoring agent C may provide monitoring data about C1 and C2 to monitoring agents A and B.

Afterward, monitoring agent A may determine, based on the received monitoring data, an optimal path for traffic flow from A1 to B1, an optimal path for traffic flow from A1 to B2, an optimal path for traffic flow from A1 to C1, and an optimal path for traffic flow from A1 to C2, an optimal path for traffic flow from A2 to B1, an optimal path for traffic flow from A2 to B2, an optimal path for traffic flow from A2 to C1, and an optimal path for traffic flow from A2 to C2. Similarly, monitoring agent B may determine, based on the received monitoring data, an optimal path for traffic flow from B1 to A1, an optimal path for traffic flow from B1 to A2, an optimal path for traffic flow from B1 to C1, and an optimal path for traffic flow from B1 to C2, an optimal path for traffic flow from B2 to A1, an optimal path for traffic flow from B2 to A2, an optimal path for traffic flow from B2 to C1, and an optimal path for traffic flow from B2 to C2. Similarly, monitoring agent C may determine, based on the received monitoring data, an optimal path for traffic flow from C1 to A1, an optimal path for traffic flow from C1 to A2, an optimal path for traffic flow from C1 to B1, and an optimal path for traffic flow from C1 to B2, an optimal path for traffic flow from C2 to A1, an optimal path for traffic flow from C2 to A2, an optimal path for traffic flow from C2 to B1, and an optimal path for traffic flow from C2 to B2. Afterward, the monitoring agents A-C may provide data describing optimal paths to controller 102, which then may program the network to use the received optimal paths.

Monitoring agents 104 may obtain monitoring data by querying monitoring APIs associated with network environments 106. Examples of monitoring APIs that may be queried include AWS CloudWatch, Azure Monitor, Google Cloud Operations, and on-premises monitoring solutions. Monitoring agents 104 can retrieve metrics on application segment locations, network latency, bandwidth, hop counts, and various other attributes by leveraging native monitoring APIs exposed by the network environments 106.

Monitoring agents 104 may connect to cloud provider APIs using authenticated service accounts. For example, an AWS monitoring agent can use an IAM role with permissions to call CloudWatch, EC2, VPC, Direct Connect, and other APIs to get monitoring metrics. An Azure monitoring agent can authenticate a service principal account having reader permissions on Virtual Machine, Virtual Network, ExpressRoute, and other Azure resource providers. A Google Cloud Platform (CGP) monitoring agent can use a service account with appropriate Cloud Operations Suite API scopes enabled. For on-premises monitoring, agents may authenticate using credentials for platforms like SolarWinds, Paessler Router Traffic Grapher (PRTG), Grafana, and various Simple Network Management Protocol (SNMP) systems.

In some implementations, the monitoring agents 104 are organized into agent clusters or hierarchical groups. Clustering agents can provide benefits such as failure tolerance, load distribution, and hierarchical monitoring data aggregation. For example, each network region may include a cluster of monitoring agents that connect to the region's application segments. The cluster internally shares monitoring data and elects a leader agent to communicate with other regions. This allows monitoring to continue if some agents in the cluster fail. The cluster also balances monitoring tasks across agents. Additionally, aggregating data within the region cluster reduces bandwidth consumption when communicating monitoring data to other regions.

Figure 2:
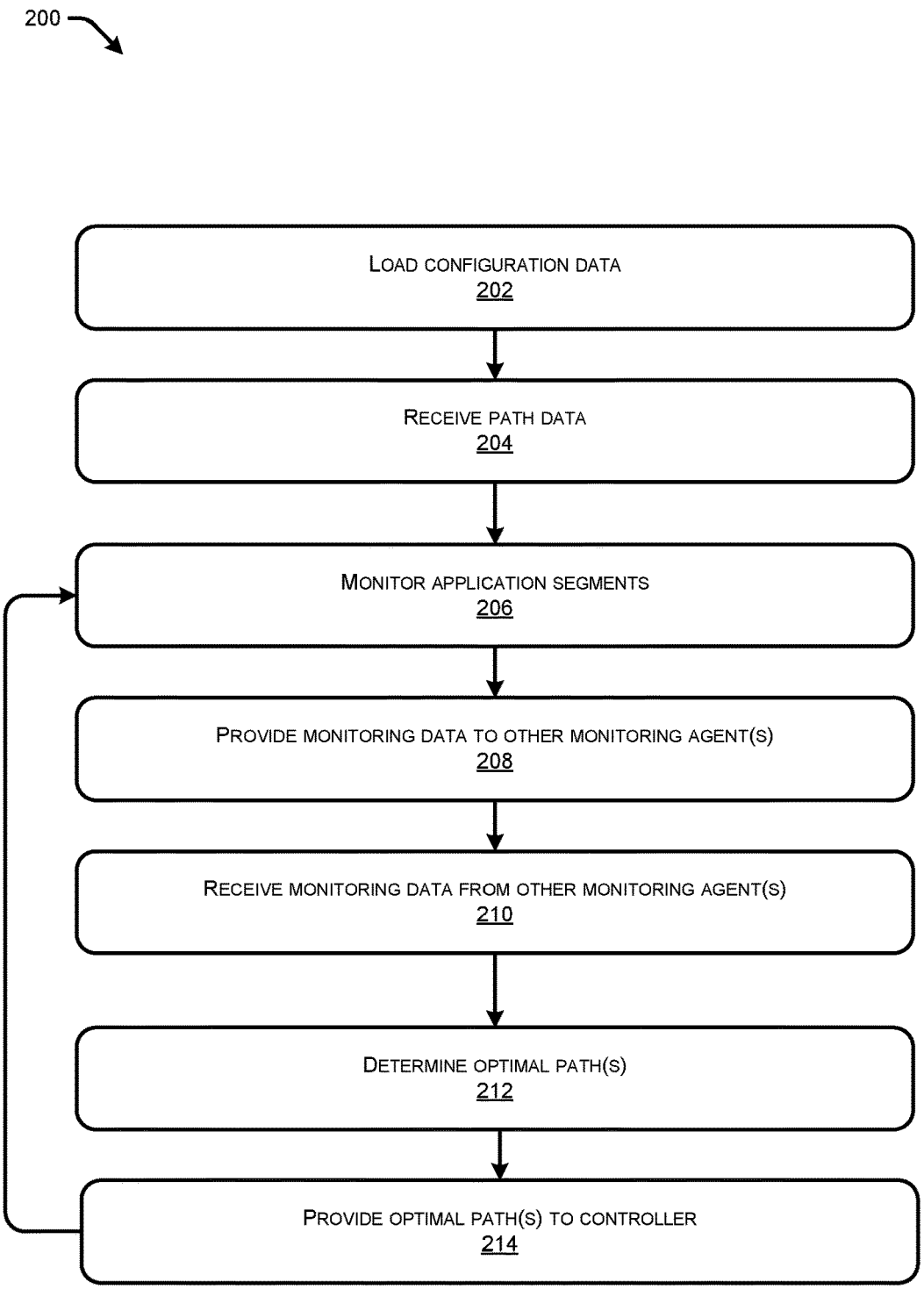
FIG. 2 is a flowchart diagram of an example process for executing operations of a monitoring agent configured to monitor application segments associated with a network region.

FIG. 2 is a flowchart diagram of an example process 200 for executing operations of a monitoring agent configured to monitor application segments associated with a network region. As depicted in FIG. 2, at operation 202, the monitoring agent loads configuration data describing application segments in the network region's environment. In some cases, configuration data describes each application segment in the agent's region and operations configured to obtain monitoring data associated with the application segment. The configuration data may be generated by the controller when setting up the monitoring agent.

At operation 204, the monitoring receives path data from the controller about other monitoring agents and paths for providing data to such monitoring agents. The paths may describe routing rules, VPN tunnels, virtual networks, or other networking constructs needed to reach the agents in other regions. The controller may provide the path data after setting up the monitoring agents and/or may include the path data as part of the configuration data generated while setting up the monitoring agent.

At operation 206, the monitoring agent monitors the application segments in the agent's region based on the monitoring operations described in the agent's configuration data. In some cases, monitoring the application segments includes querying various monitoring APIs to gather metrics about the application segments in the local region. Examples of monitoring APIs include AWS CloudWatch, Azure Monitor, and on-premises solutions like SolarWinds. The agent may authenticate with proper credentials for each API and extract segment attributes like geographic location, network latency, bandwidth utilization, and more.

Examples of monitoring data that may be collected by a monitoring agent include data about the geographic locations of an application segment, data about the latency of network links in an application segment, data about the bandwidth of network links in the application segment, data about the number of hops associated with network links in the application segments, data about attachment types of network links in application segments, and/or the like.

At operation 208, the monitoring agent provides monitoring data obtained at operation 206 to other monitoring agents. In some cases, the monitoring agent periodically sends the collected monitoring data to the remote agents that the monitoring agent learned about previously from the controller. The monitoring data may be transmitted using the network paths provided by the controller. The monitoring agent may use encoding schemes to optimize the payload size of the shared data.

At operation 210, the monitoring agent receives monitoring data collected by the remote agents about application segments in their respective regions. This data may include data about the geographic locations of application segments in other regions, data about the latency of network links in application segments in other regions, data about the bandwidth of network links in application segments in other regions, data about the number of hops associated with network links in application segments in other regions, data about attachment types of network links in application segments in other regions, and/or the like.

At operation 212, the monitoring agent determines an optimal path for each segment pair that includes an application segment within the agent's region and an application segment outside of the agent's region. In some cases, the monitoring agent determines an optimal path for each segment pair including pairs of application segments both of which belong to the agent's region.

In some cases, to determine an optimal path for a segment pair, the monitoring agent first identifies a set of candidate paths between the application segments in the segment pair. Each candidate path may include a set of network regions traversed to reach from the first application segment in the pair to the second application segment in the pair.

For example, if a segment pair includes a segment A1 from a network region A and a segment C1 from the network region C, then the following candidate paths may be selected {A1→B>C}, {A1→D→C2}, and {A1→E→C2}. In some cases, the set of candidate paths are selected such that paths including regions that are more than a threshold distance from the source segment are excluded if paths excluding such distant regions are available. For example, if region F is determined to be more than a threshold distance from the network region A, then the candidate path {A1→G→F→D→C2} may be excluded.

In some cases, after determining the set of candidate paths, the set of paths are ranked N times in accordance with a set of N monitoring criteria. For example, the set of optimal paths may be ranked once in accordance with geographic distance traversed by the paths, once in accordance with the latency of links associated with the paths, once in accordance with the bandwidth of the links associated with the paths, once in accordance with a ration of presence of routing nodes along the paths, and once in accordance with the desirability of attachment links used by the links associated with the path.

Accordingly, a distance-based ranking may specify which candidate path covers the least distance, which candidate path covers the second-least distance, and so on. Furthermore, a latency-based ranking may specify which candidate path has links with the least latency, which candidate path has links with second-least latency, and so on.

After ranking the candidate paths N times, each candidate path may be assigned N ranking scores, each ranking score being based at least in part on the position of the path within each ranking. For example, if a candidate path is a top-ranked path in all the N rankings, it may be assigned N ranking scores of 1. As another example, if a candidate path is a top-ranked path in N−1 ranking and a second-top-ranked path in one ranking, it may be assigned N−1 ranking scores of 1 and a ranking score of 0.95.

In some cases, the path score of a candidate path is the mean and/or weighted mean of the ranking scores associated with the path. For example, if a candidate path is a top-ranked path in all the N rankings, it may be assigned a path score of one. In some cases, the optimal path for a segment pair is: (i) if one of the candidate paths associated with the segment pair has a path score of one, the candidate path with the path score of one, and (ii) if none of the candidate paths associated with the segment pair has a path score of one, the candidate path with the highest path score.

At operation 214, the monitoring agent provides the optimal path scores determined at operation 212 to the controller. The controller may then use these optimal paths to program the network. In some cases, after operation 214, the process 200 returns to operation 206 to provide for continual monitoring by the monitoring agents.

Figure 3:
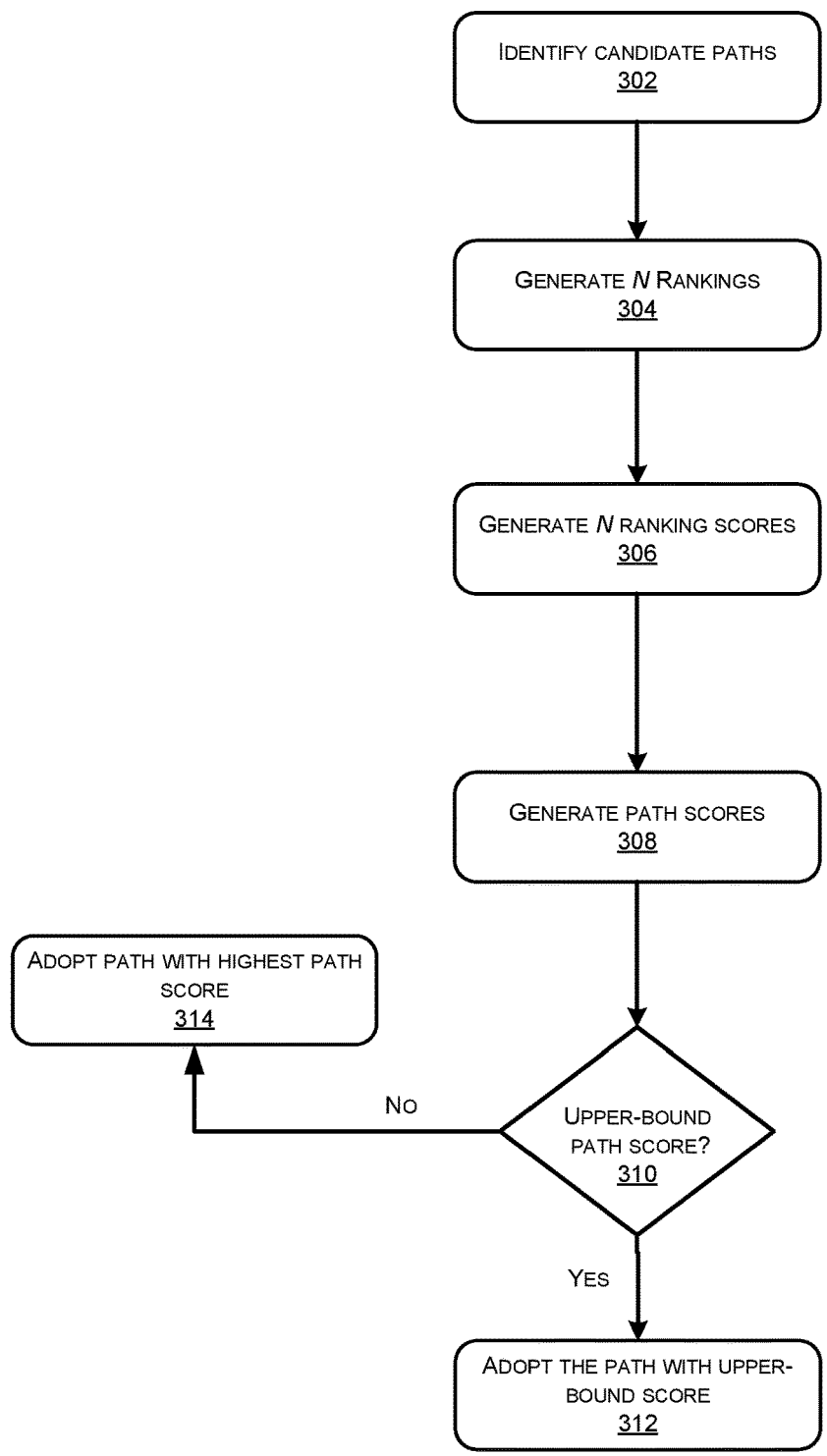
FIG. 3 is a flowchart diagram of an example process for selecting an optimal path between a pair of application segments.

FIG. 3 is a flowchart diagram of an example process 300 for selecting an optimal path between a pair of application segments. The process 300 begins at operation 302 when the system identifies a set of candidate paths between the pair of application segments A and B. In some cases, the system analyzes the network topology to find all potential paths that connect segments A and B. The system may select multiple candidate path options that meet basic requirements like connectivity and absence of distant regions.

At operation 304, the system ranks the candidate paths according to N different monitoring criteria such as geographic distance, link latency, link bandwidth, routing node presence, and attachment type desirability. For each monitoring criterion, the system may order the paths from best to worst. For example, for geographic distance, the paths may be ranked from shortest distance traversed to longest distance traversed. For latency, the paths may be ranked from lowest latency to highest based on the links making up each path. The system may perform this ranking separately for each of the N monitoring criteria.

At operation 306, the system assigns each candidate path a ranking score for each of N monitoring criteria based on the position of the path in each ranking. In some cases, the top-ranked path in a ranking is assigned a score of 1, the second-ranked path is assigned a score of 0.95, the third-ranked is assigned a score of 0.90 etc. Accordingly, after operation 306, each candidate path may be associated with N ranking scores.

At operation 308, the system calculates a path score for each candidate path based on the N ranking scores associated with the path. For example, the system may determine the path score for a candidate path based on the mean or weighted mean of the N assigned ranking scores associated with the path.

At operation 310, the system determines whether any candidate path has an upper-bound possible path score (e.g., a path score of 1), indicating that the candidate path was top ranked across all criteria. If there is a path with the upper-bound path score (operation 310—Yes), the system selects that path as the optimal path at operation 312. If there is no path with the maximum path score (operation 310—No), the system selects the candidate path with the highest path score as the optimal path at operation 314.

Figure 4:
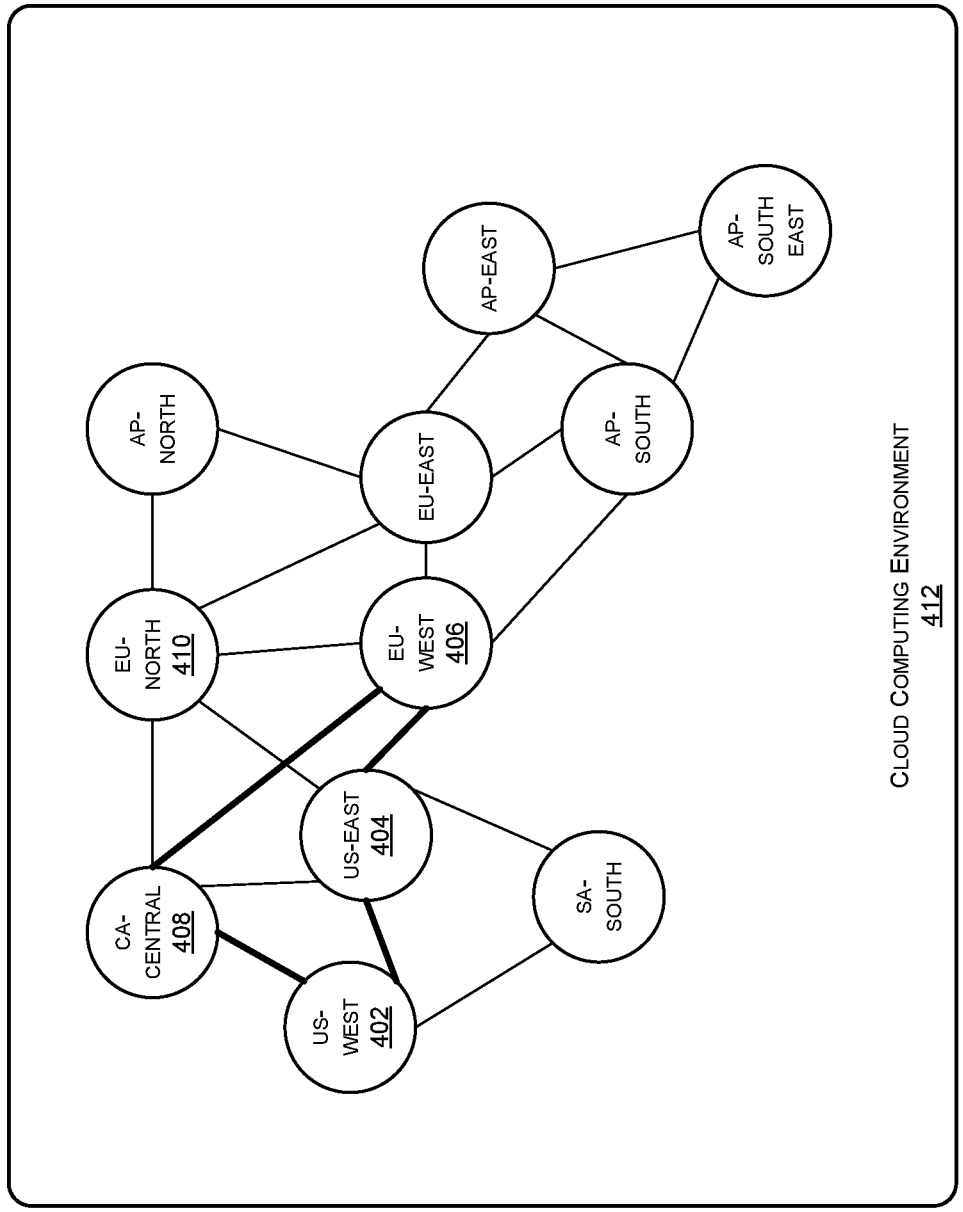
FIG. 4 provides an operational of optimal path selection within an example network with a set of network regions within a cloud computing environment.

FIG. 4 provides an operational example of optimal path selection within an example network 400 with a set of network regions within one cloud computing environment 412, such as the us-west region 402, the us-east region 404, the eu-west region 406, the ca-central region 408, and the eu-north region 410. As depicted in FIG. 4, the optimal path from the us-west region 402 to the ca-central region 408 is the path that goes from the us-west region 402, to the us-east region 404, to the eu-west region 406, and to the ca-central region 408. This path is selected over the direct path from the us-west region 402 to ca-central region 408. This selection may happen if, for example, the direct path is associated with excessive latency and/or low bandwidth.

Figure 5:
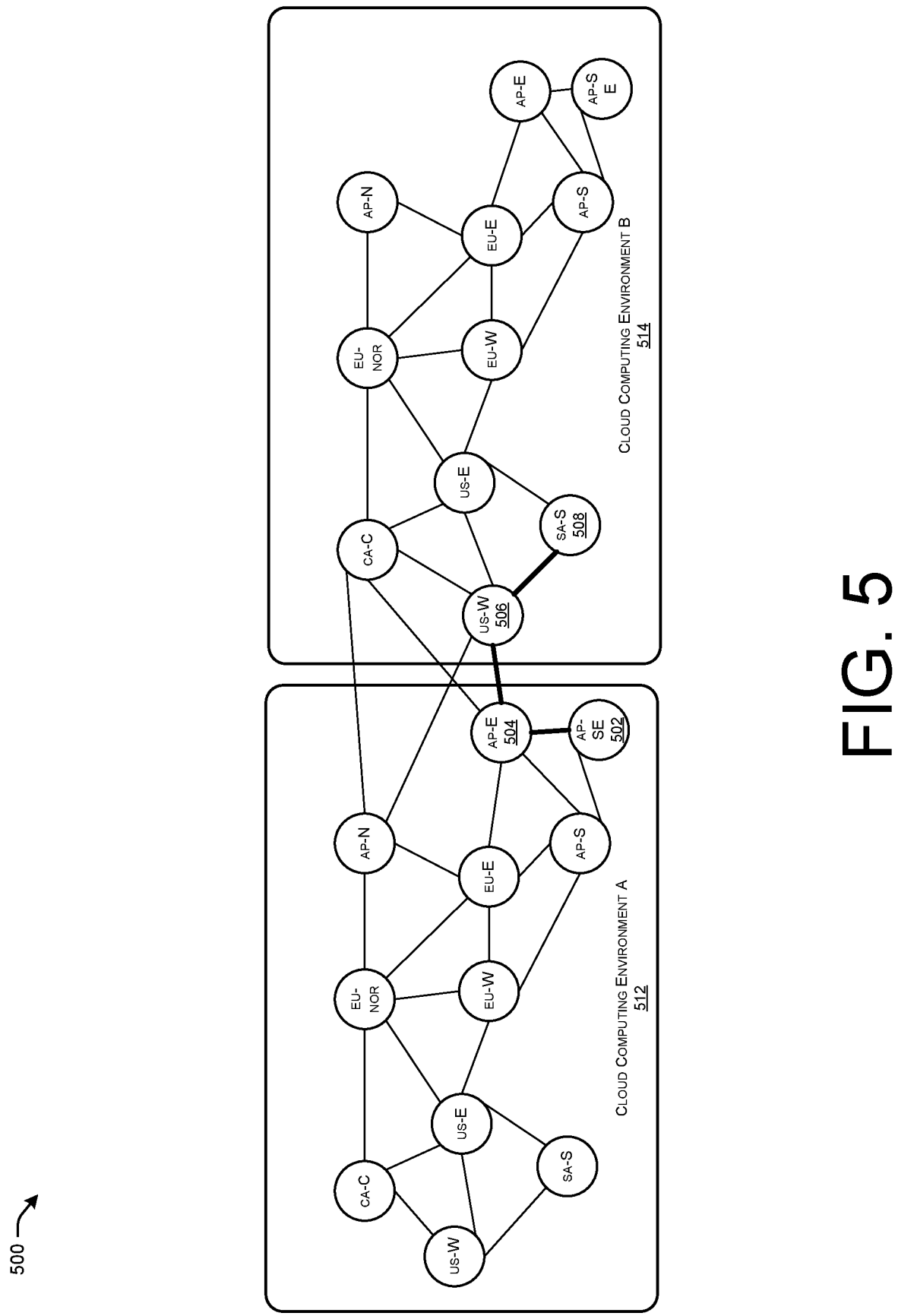
FIG. 5 provides an operational example of optimal path selection within an example network with a set of network regions within two cloud computing environments.

FIG. 5 provides an operational example of optimal path selection within an example network 500 with a set of network regions within two cloud computing environments: cloud computing environment A 512 and the cloud computing environment B 514. As depicted in FIG. 5, the optimal path from the ap-southeast region 502 within the cloud computing environment A 512 to the sa-south region 508 region within the cloud computing environment B 514 is one that goes through the ap-east region 504 within the cloud computing environment A 512 and the us-west region 506 within the cloud computing environment B 514.

Figure 6:
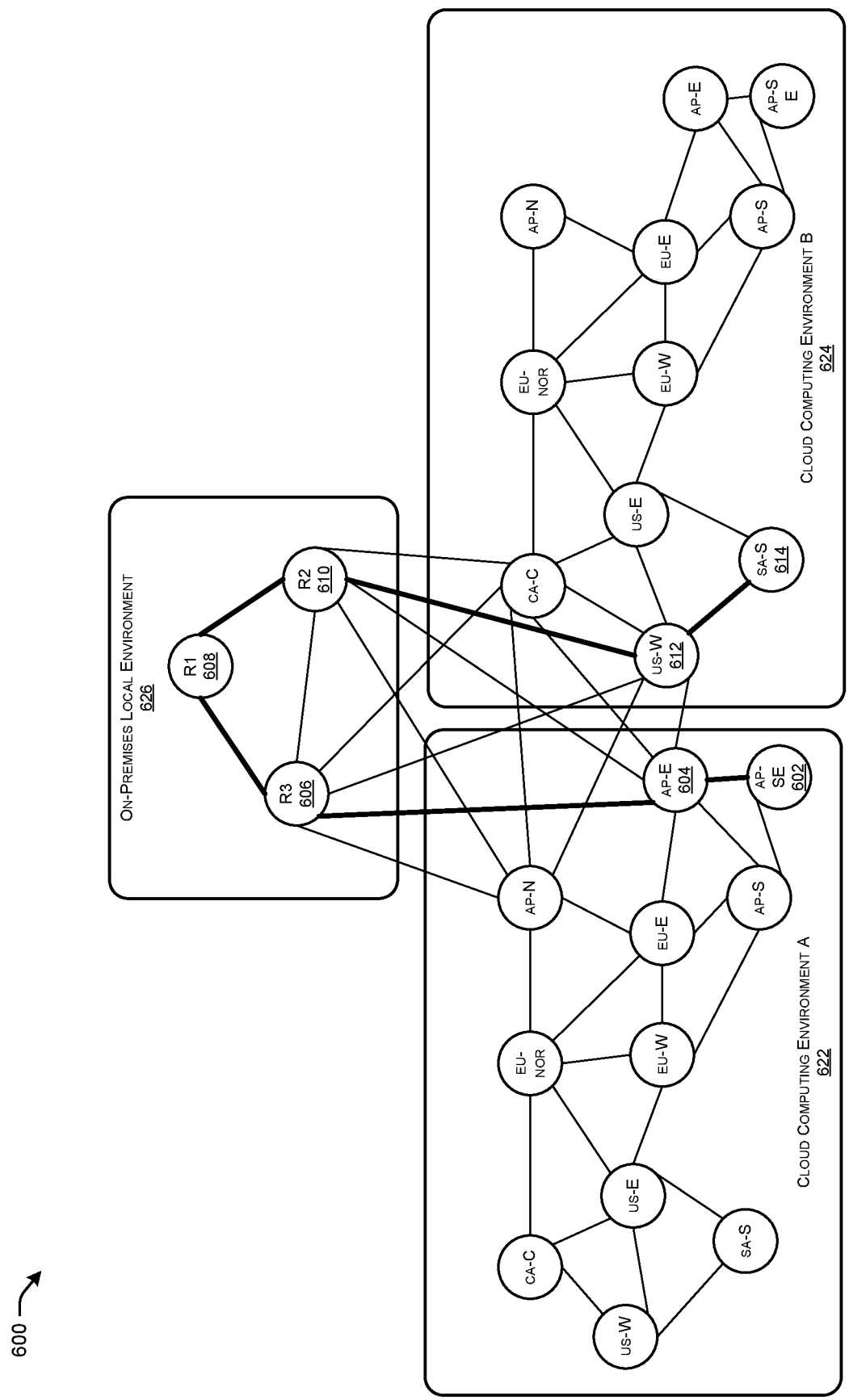
FIG. 6 provides an operational example of optimal path selection within an example network with a set of network regions within two cloud computing environments and an on-premises local environment.

FIG. 6 provides an operational example of optimal path selection within an example network 600 with a set of network regions within two cloud computing environments and an on-premises local environment: cloud computing environment A 622, the cloud computing environment B 624, and on-premises local environment 626. As depicted in FIG. 6, the optimal path from the ap-southeast region 602 within the cloud computing environment A 622 to the sa-south region 614 region within the cloud computing environment B 624 is one that goes through the ap-cast region 604 within the cloud computing environment A 622, region3 region 606 within the on-premises local environment 626, region1 region 608 within the on-premises local environment 626, region2 region 610 within the on-premises local environment 626, and the us-west region 612 within the cloud computing environment B 624.

Figure 7:
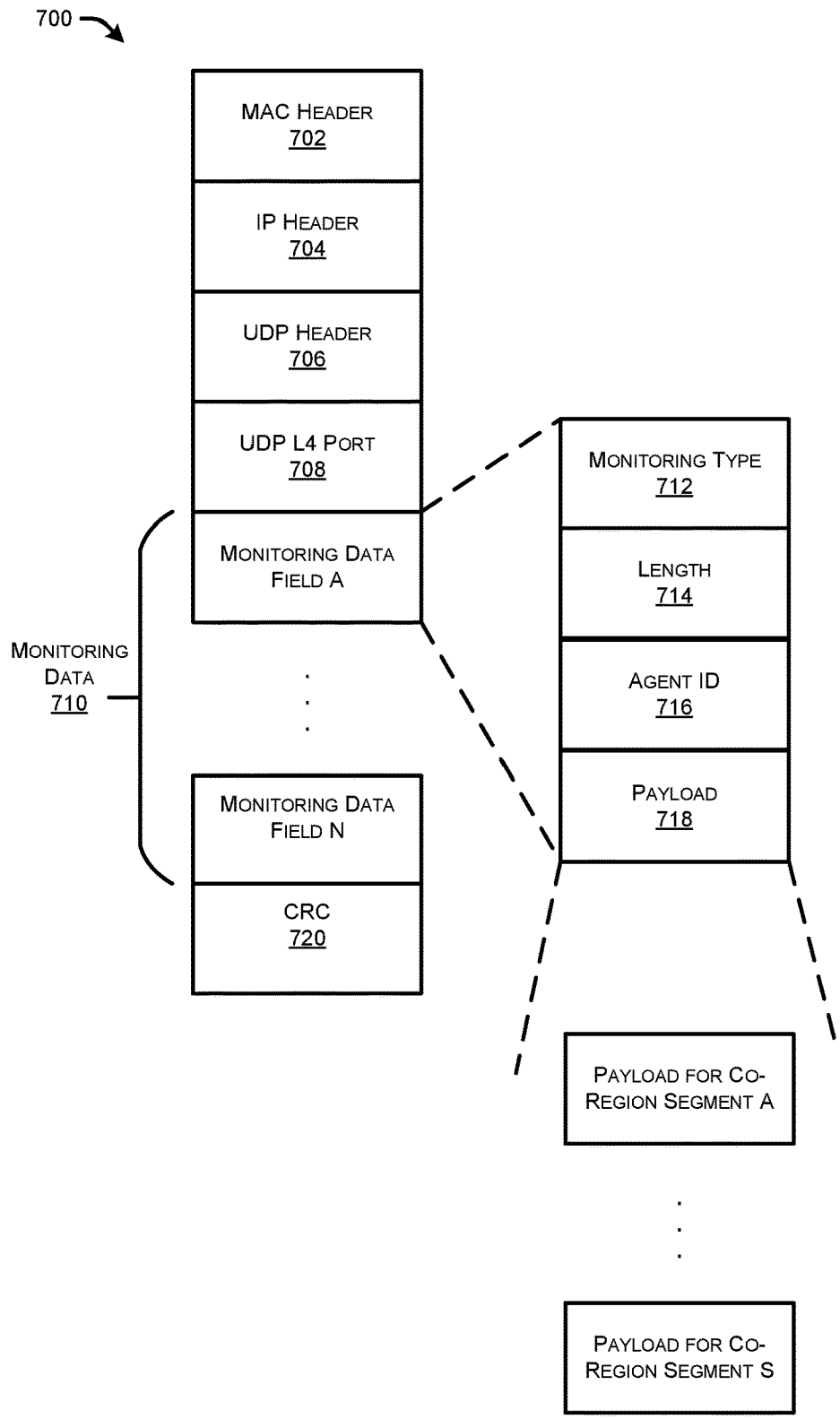
FIG. 7 provides an example data packet format for a data packet configured to transmit monitoring data from a monitoring agent to one or more other monitoring agents.

FIG. 7 provides an example data packet format 700 for a data packet configured to transmit monitoring data from a monitoring agent to one or more other monitoring agents. As depicted in FIG. 7, the data packet format 700 includes a media access control (MAC) header 702, an Internet Protocol (IP) header 704, a user datagram protocol (UDP) header 706, a Cyclic Redundancy Check (CRC) field 720, and a field 708 describing a UDP header L4 port. The field 708 may describe an L4 Source Port, which may be an extension of the UDP source port tailored for specific applications or processes, and an L4 Destination Port, an extension of the UDP destination port designed for specific applications or processes. For example, field 708 may describe that the data packet describes monitoring data collected by a monitoring agent.

As further depicted in FIG. 7, the data packet format 700 includes a set of monitoring data fields 710. Each monitoring data field may include monitoring data of a particular type. For example, one monitoring data may include geographic location data associated with application segments within an agent's region, while another monitoring data field may describe bandwidth data for those segments. In some cases, given N monitoring criteria, there may be N monitoring fields in a data packet corresponding to the data packet format 700.

In some cases, a monitoring data field may include a type sub-field 712 that designates the type of monitoring data reported by the field (e.g., whether the field includes location data, bandwidth data, latency data, attachment type data, etc.), a length sub-field 714 that describes a length of the monitoring field, an identifier sub-field 716 with a unique identifier of the monitoring agent, and a payload sub-field 718 that describes monitoring data of the corresponding type for each of the application segments within the agent's region. For example, the payload sub-field may describe the location data for a first application segment within the agent's region, location data for a second application within the agent's region, and so on.

Figure 8:
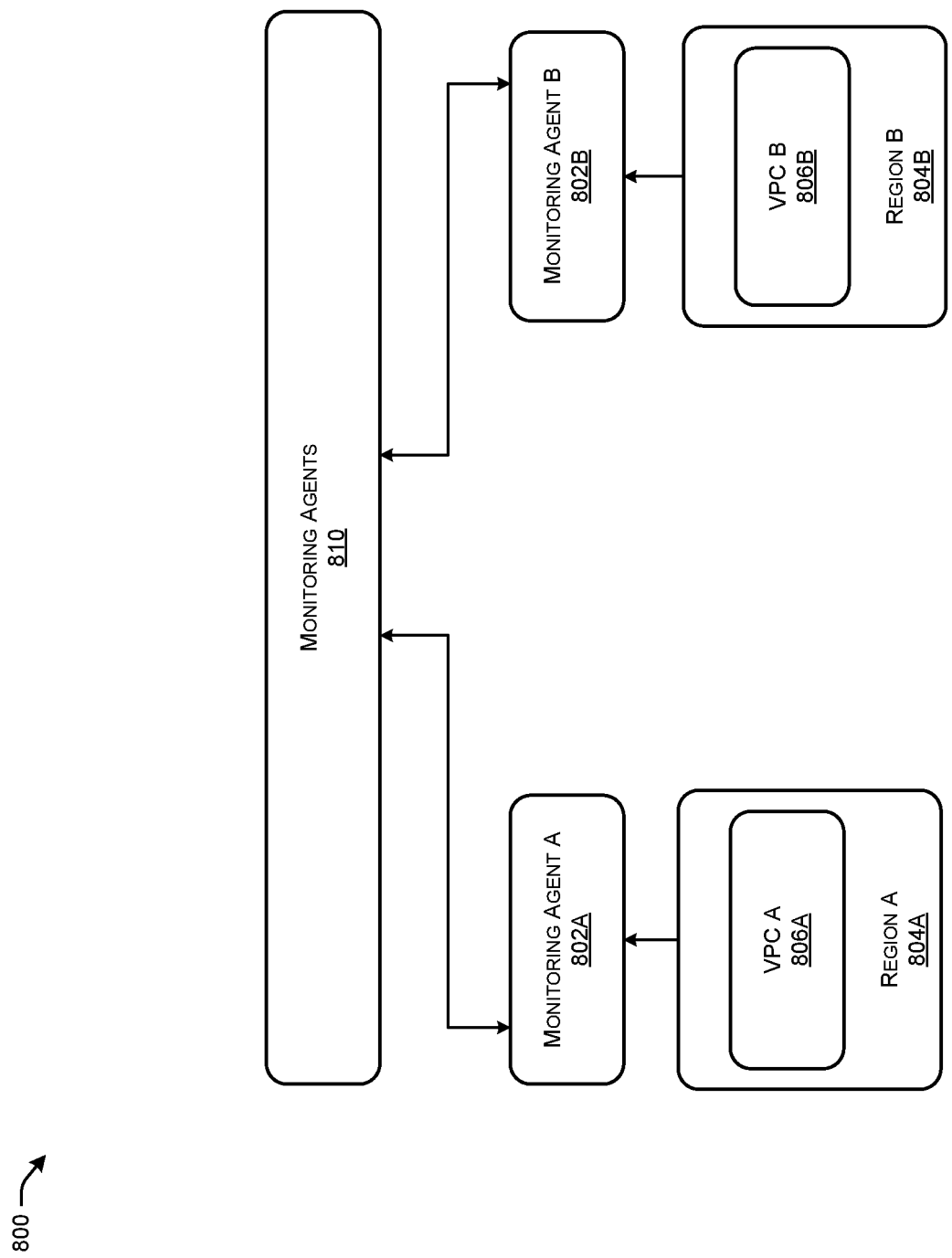
FIG. 8 provides an operational example of a monitoring control plane for the transmission of monitoring data between two monitoring agents.

FIG. 8 provides an operational example 800 of a monitoring control plane 810 for transmission of monitoring data between two monitoring agents: a monitoring agent A 802A that monitors a network region A 804A with a VPC A 806A and a monitoring agent B 802B that monitors a network region B 804B with a VPC B 806B. As depicted in FIG. 8, the two monitoring agents communicate using the monitoring control plane 810 to aggregate, exchange, and process the monitoring data collected from their respective network regions. The communication may initiate when monitoring agent A 802A gathers relevant data from network region A 804A, including metrics and configurations from VPC A 806A. Additionally, monitoring agent B 802B may collect data from network region B 804B and its associated VPC B 806B.

In some cases, after the data is collected, each agent preprocesses this information, converting raw metrics into a standardized format suitable for transmission. Subsequently, through the monitoring control plane 810, the standardized data from both agents may be exchanged. This data transfer may ensure that each agent is not only aware of the conditions and metrics of its own network region but also of the other's region. The bidirectional flow of information may enable the agents to perform cross-region analysis to ensure optimal interconnectivity between VPC A 806A and VPC B 806B.

Figure 9:
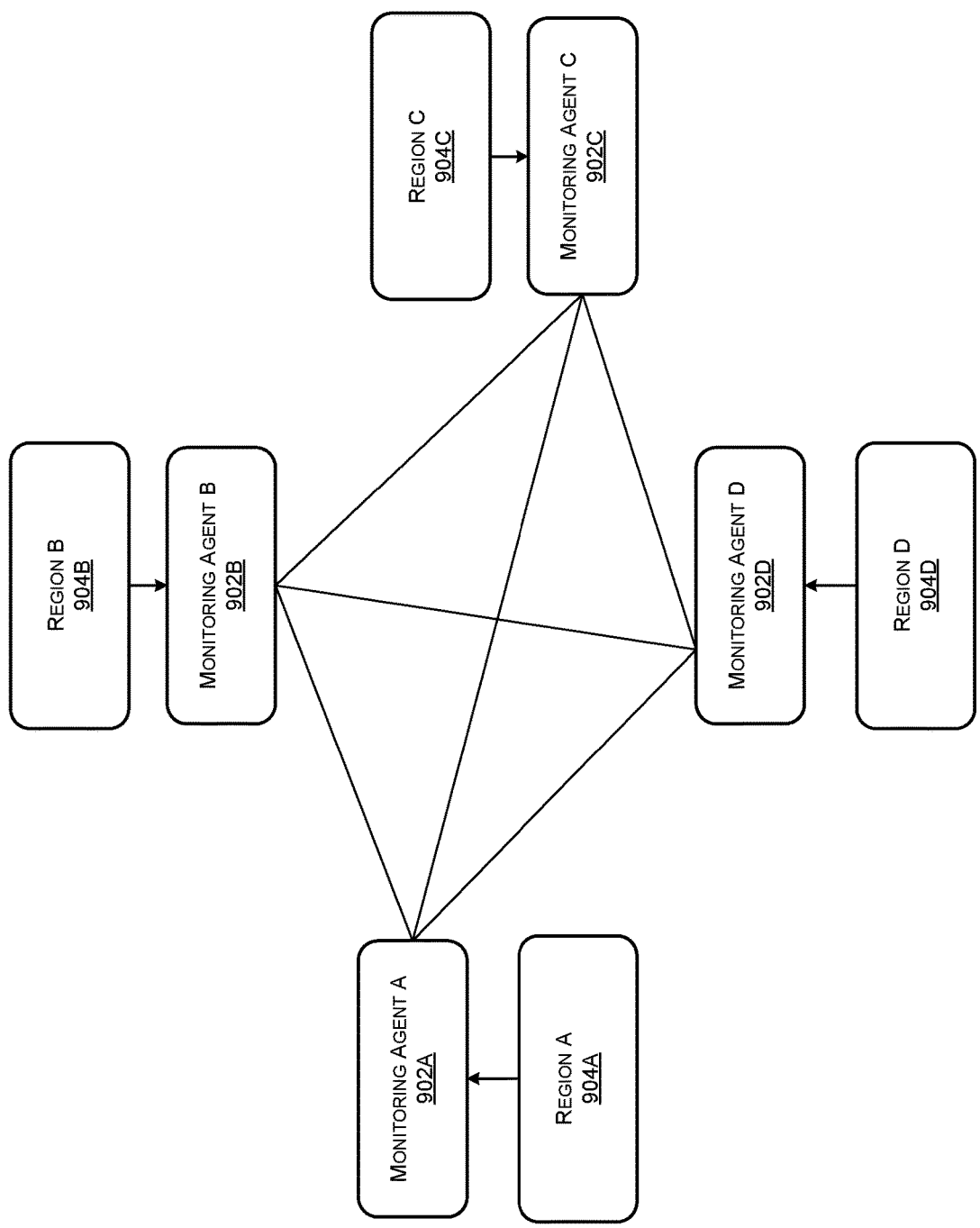
FIG. 9 provides an operational example of a full-mesh arrangement for the transmission of monitoring data between monitoring agents.

FIG. 9 provides an operational example of a full-mesh arrangement 900 for the transmission of monitoring data between four monitoring agents (monitoring agent A 902A, monitoring agent B 902B, monitoring agent C 902C, and monitoring agent D 902D) associated with four network regions (networking region A 904A, networking region B 904B, networking region C 904C, and networking region D 904D). As depicted in FIG. 9, in accordance with the full-mesh arrangement 900, each monitoring agent provides monitoring data to every one of the other monitoring agents by transmitting a packet to the recipient agent. Accordingly, no agent needs to forward monitoring data received from another monitoring agent to other monitoring agents.

Figure 10:
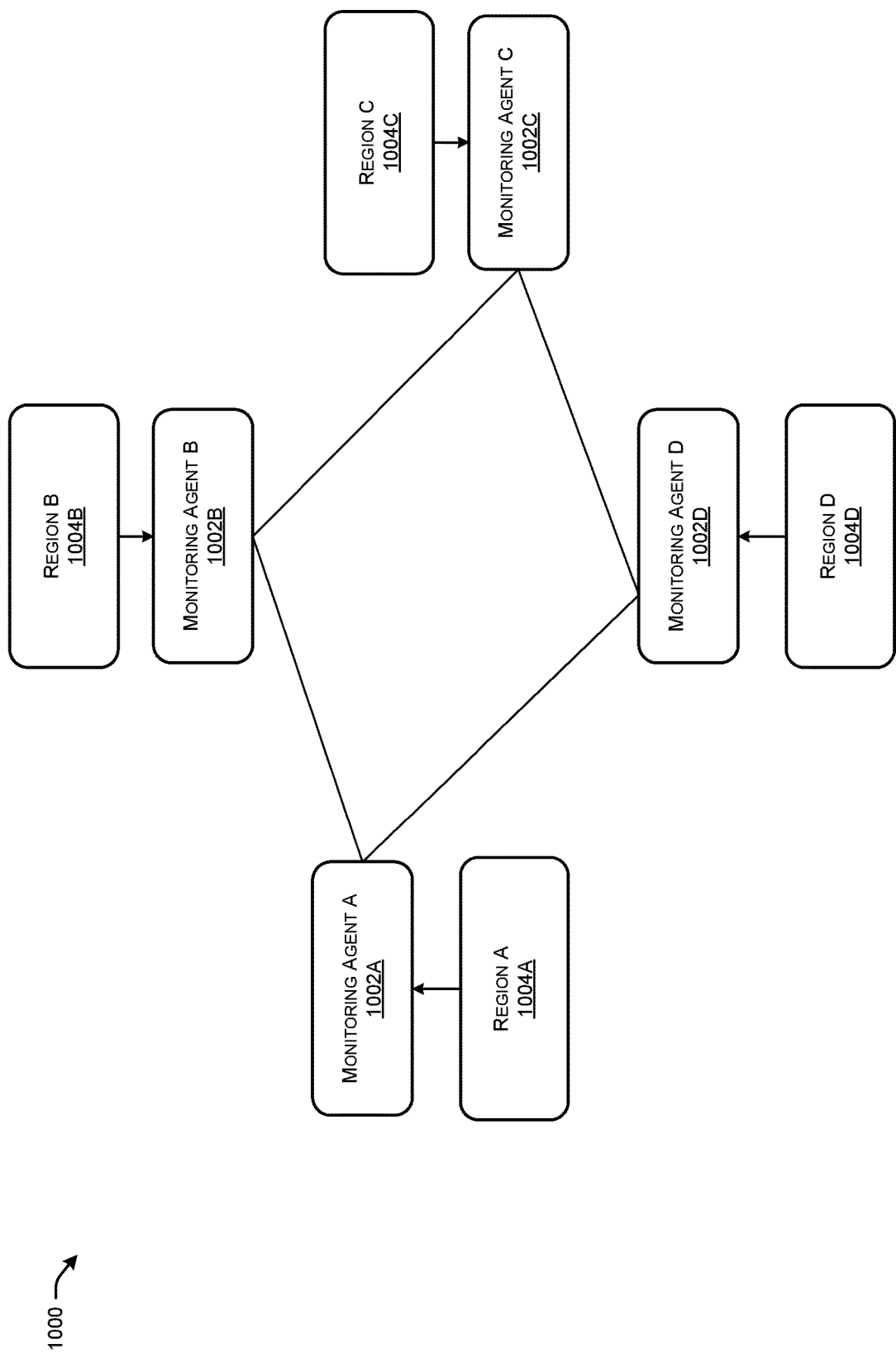
FIG. 10 provides an operational example of a neighborhood arrangement for the transmission of monitoring data between monitoring agents.

FIG. 10 provides an operational example of a neighborhood arrangement 1000 for the transmission of monitoring data between four monitoring agents (monitoring agent A 1002A, monitoring agent B 1002B, monitoring agent C 1002C, and monitoring agent D 1002D) associated with four network regions (networking region A 1004A, networking region B 1004B, networking region C 1004C, and networking region D 1004D). As depicted in FIG. 10, in accordance with neighborhood arrangement 1000, each monitoring agent provides monitoring data to its neighbor agents but not to other agents. Moreover, each monitoring agent provides monitoring data received from one neighbor agent to other neighbor agents.

Figure 11:
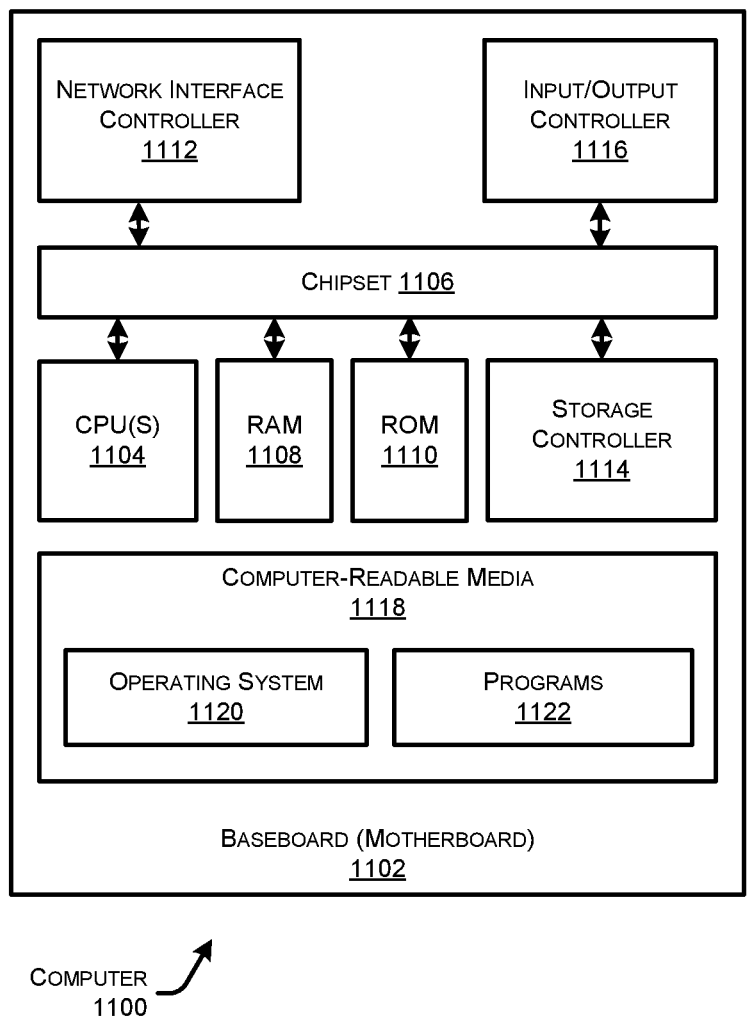
FIG. 11 shows an example computer architecture for a computing device (or network routing device) capable of executing program components for implementing the functionality described above.

FIG. 11 shows an example computer architecture for a computing device (or network routing device) 1100 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein.

The computing device 1100 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computing device 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computing device 1100. The chipset 1106 can further provide an interface to a computer-readable storage medium such as a read-only memory ("ROM") 1110 or non-volatile RAM ("NVRAM") for storing basic routines that help to start up the computing device 1100 and to transfer information between the various components and devices. The ROM 1110 or NVRAM can also store other software components necessary for the operation of the computing device 1100 in accordance with the configurations described herein.

The computing device 1100 can operate in a networked environment using logical connections to remote computing devices and computer systems through a network. The chipset 1106 can include functionality for providing network connectivity through a NIC 1112, such as a gigabit Ethernet adapter. The NIC 1112 can connect the computing device 1100 to other computing devices over the network. It should be appreciated that multiple NICs 1112 can be present in the computing device 1100, connecting the computer to other types of networks and remote computer systems.

The computing device 1100 can be connected to a storage device 1118 that provides non-volatile storage for the computing device 1100. The storage device 1118 can store an operating system 1120, programs 1122, and data, which have been described in greater detail herein. The storage device 1118 can be connected to the computing device 1100 through a storage controller 1114 connected to the chipset 1106. The storage device 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 1100 can store data on the storage device 1118 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1118 is characterized as primary or secondary storage, and the like.

For example, the computing device 1100 can store information to the storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 can further read information from the storage device 1118 by detecting the physical states or characteristics of one or more locations within the physical storage units.

In addition to the mass storage device 1118 described above, the computing device 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 1100. In some examples, the operations performed by a network, and/or any components included therein (e.g., a router, such as an edge router), may be supported by one or more devices similar to computing device 1100. Stated otherwise, some or all of the operations performed by the network, and or any components included therein, may be performed by one or more computing device 1100 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1118 can store an operating system 1120 utilized to control the operation of the computing device 1100. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1118 can store other system or application programs and data utilized by the computing device 1100.

In one embodiment, the storage device 1118 or other computer-readable storage media is encoded with computer-executable instructions which, when loaded into the computing device 1100, transform the computer from a general-purpose computing system into a special-purpose computer capable of implementing the embodiments described herein. These computer-executable instructions transform the computing device 1100 by specifying how the CPUs 1104 transition between states, as described above. According to one embodiment, the computing device 1100 has access to computer-readable storage media storing computer-executable instructions which, when executed by the computing device 1100, perform the various processes described above with regard to FIGS. 1-10. The computing device 1100 can also include computer-readable storage media having instructions stored thereupon for performing any of the other computer-implemented operations described herein.

The computing device 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the computing device 1100 might not include all of the components shown in FIG. 11, can include other components that are not explicitly shown in FIG. 11, or might utilize an architecture completely different than that shown in FIG. 11.

The computing device 1100 may support a virtualization layer, such as one or more components associated with a computing resource network. The virtualization layer may provide virtual machines or containers that abstract the underlying hardware resources and enable multiple operating systems or applications to run simultaneously on the same physical machine. The virtualization layer may also include components for managing the virtualized resources, such as a hypervisor or virtual machine manager, and may provide network virtualization capabilities, such as virtual switches, routers, or firewalls. By enabling the sharing and efficient utilization of physical resources, virtualization can help reduce costs, simplify management, and increase flexibility in deploying and scaling computing workloads. The computing device 1100 may also support other software layers, such as middleware, application frameworks, or databases, that provide additional abstraction and services to application developers and users. In some cases, the computing device 1100 may provide a flexible and scalable platform for hosting diverse workloads and applications, from simple web services to complex data analytics and machine learning tasks.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:
   detecting, by a first monitoring agent configured to monitor a first network region in a first a first computer network associated with a software application, first monitoring data associated with a first application segment in the first network region and second monitoring data associated with a second application segment in the first network region, wherein: (i) the first monitoring data represents a first geographic location of a first computer functionality associated with the first application segment, and (ii) the second monitoring data represents a first bandwidth measure for a first network link in the second application segment;
   receiving, by the first monitoring agent and from a second monitoring agent configured to monitor a second network region of the first computer network, third monitoring data associated with a third application segment in the second network region and fourth monitoring data associated with a fourth application segment in the second network region, wherein: (i) the third monitoring data represents a second geographic location of a second computer functionality associated with the third application segment, and (ii) the fourth monitoring data represents a second bandwidth measure for a second network link in the fourth application segment;
   determining, by the first monitoring agent and based on the third monitoring data and the fourth monitoring data, a first path score for a first candidate path between the first application segment and the third application segment and a second path score for a second candidate path between the second application segment and the fourth application segment; and
   providing, by the first monitoring agent and to a controller, output data determined based on the first path score and the second path score, wherein the controller is configured to control traffic flow between the first network region and the second network region based on the output data.

2. The method of claim 1, wherein the first network region is associated with a cloud computing environment and the second network region is associated with an on-premises network environment.

3. The method of claim 1, wherein the first network region is associated with a first cloud computing environment and the second network region is associated with a second cloud computing environment.

4. The method of claim 1, wherein:
   the first network region is associated with a cloud computing environment; and
   the first monitoring data further comprises an indicator of whether the first computer functionality is associated with a router node of the cloud computing environment.

5. The method of claim 1, wherein:
   the first network region is associated with a cloud computing environment; and
   the second monitoring data further comprises an indicator of whether the first network link is implemented using virtual private cloud (VPC) peering.

6. The method of claim 1, wherein the output data represents that the first candidate path is optimal for traffic flow between the first application segment and the second application segment.

7. The method of claim 1, wherein:
   the first network region is associated with a cloud computing environment; and
   detecting the first monitoring data comprises querying a first monitoring component of the cloud computing environment.

8. The method of claim 1, wherein determining the first path score comprises:

calculating a first geographical factor based on the first geographic location and the second geographic location;
calculating a first bandwidth factor based on the first bandwidth measure and the second bandwidth measure; and
determining the first path score based on a function of the first geographical factor and the first bandwidth factor.

9. The method of claim 8, wherein determining the first path score further comprises:
determining a first latency measure for the first candidate path based on timestamps of monitoring data exchanged between the first monitoring agent and the second monitoring agent;
calculating a first latency factor based on the first latency measure; and
determining the first path score based on a function of the first geographical factor, the first bandwidth factor, and the first latency factor.

10. The method of claim 1, further comprising:
detecting, by the first monitoring agent, updated monitoring data associated with the first candidate path;
determining, by the first monitoring agent, an updated first path score based on the updated monitoring data; and
providing, by the first monitoring agent and to the controller, updated output data determined based on the updated first path score.

11. A system comprising:
one or more processors; and
one or more computer-readable media storing computer-executable instructions that, when executed by a processor of a first computing device, cause the processor to perform operations comprising:
detecting, by a first monitoring agent configured to monitor a first network region in a first a first computer network associated with a software application, first monitoring data associated with a first application segment in the first network region and second monitoring data associated with a second application segment in the first network region, wherein: (i) the first monitoring data represents a first geographic location of a first computer functionality associated with the first application segment, and (ii) the second monitoring data represents a first bandwidth measure for a first network link in the second application segment;
receiving, by the first monitoring agent and from a second monitoring agent configured to monitor a second network region of the first computer network, third monitoring data associated with a third application segment in the second network region and fourth monitoring data associated with a fourth application segment in the second network region, wherein: (i) the third monitoring data represents a second geographic location of a second computer functionality associated with the third application segment, and (ii) the fourth monitoring data represents a second bandwidth measure for a second network link in the fourth application segment;
determining, by the first monitoring agent and based on the third monitoring data and the fourth monitoring data, a first path score for a first candidate path between the first application segment and the third application segment and a second path score for a second candidate path between the second application segment and the fourth application segment; and
providing, by the first monitoring agent and to a controller, output data determined based on the first path score and the second path score, wherein the controller is configured to control traffic flow between the first network region and the second network region based on the output data.

12. The system of claim 11, wherein the first network region is associated with a cloud computing environment and the second network region is associated with an on-premises network environment.

13. The system of claim 11, wherein the first network region is associated with a first cloud computing environment and the second network region is associated with a second cloud computing environment.

14. The system of claim 11, wherein:
the first network region is associated with a cloud computing environment; and
the first monitoring data further comprises an indicator of whether the first computer functionality is associated with a router node of the cloud computing environment.

15. The system of claim 11, wherein:
the first network region is associated with a cloud computing environment; and
the second monitoring data further comprises an indicator of whether the first network link is implemented using virtual private cloud (VPC) peering.

16. One or more non-transitory computer-readable media storing computer-executable instructions that, when executed by a processor of a first computing device, cause the processor to perform operations, comprising:
detecting, by a first monitoring agent configured to monitor a first network region in a first a first computer network associated with a software application, first monitoring data associated with a first application segment in the first network region and second monitoring data associated with a second application segment in the first network region, wherein: (i) the first monitoring data represents a first geographic location of a first computer functionality associated with the first application segment, and (ii) the second monitoring data represents a first bandwidth measure for a first network link in the second application segment;
receiving, by the first monitoring agent and from a second monitoring agent configured to monitor a second network region of the first computer network, third monitoring data associated with a third application segment in the second network region and fourth monitoring data associated with a fourth application segment in the second network region, wherein: (i) the third monitoring data represents a second geographic location of a second computer functionality associated with the third application segment, and (ii) the fourth monitoring data represents a second bandwidth measure for a second network link in the fourth application segment;
determining, by the first monitoring agent and based on the third monitoring data and the fourth monitoring data, a first path score for a first candidate path between the first application segment and the third application segment and a second path score for a second candidate path between the second application segment and the fourth application segment; and
providing, by the first monitoring agent and to a controller, output data determined based on the first path score and the second path score, wherein the controller is configured to control traffic flow between the first network region and the second network region based on the output data.

17. The one or more non-transitory computer-readable media of claim 16, wherein the first network region is associated with a cloud computing environment and the second network region is associated with an on-premises network environment.

18. The one or more non-transitory computer-readable media of claim 16, wherein the first network region is associated with a first cloud computing environment and the second network region is associated with a second cloud computing environment.

19. The one or more non-transitory computer-readable media of claim 16, wherein:
- the first network region is associated with a cloud computing environment; and
- the first monitoring data further comprises an indicator of whether the first computer functionality is associated with a router node of the cloud computing environment.

20. The one or more non-transitory computer-readable media of claim 16, wherein:
- the first network region is associated with a cloud computing environment; and
- the second monitoring data further comprises an indicator of whether the first network link is implemented using virtual private cloud (VPC) peering.

\* \* \* \* \*